(12) United States Patent
Morey et al.

(10) Patent No.: US 7,142,749 B2
(45) Date of Patent: Nov. 28, 2006

(54) SYSTEM AND METHOD FOR CONTROLLING SPECTRAL PASSBAND PROFILE

(75) Inventors: William W. Morey, Northridge, CA (US); Xuegong Deng, Piscataway, NJ (US); James W. Horwitz, Goleta, CA (US); Jie Qiao, Cambridge, MA (US)

(73) Assignee: Finisar Corporation, Sunnyvale, CA (US)

( * ) Notice: Subject to any disclaimer, the term of this patent is extended or adjusted under 35 U.S.C. 154(b) by 563 days.

(21) Appl. No.: 10/185,986

(22) Filed: Jun. 26, 2002

(65) Prior Publication Data

US 2003/0053752 A1   Mar. 20, 2003

Related U.S. Application Data

(60) Provisional application No. 60/301,322, filed on Jun. 27, 2001.

(51) Int. Cl.
*G02B 6/34* (2006.01)
*G02B 6/32* (2006.01)
*G02B 6/293* (2006.01)

(52) U.S. Cl. .............. 385/37; 385/24; 385/31; 385/33

(58) Field of Classification Search ............... 385/15, 385/24, 31, 33, 35, 37, 39
See application file for complete search history.

(56) References Cited

U.S. PATENT DOCUMENTS

| | | | |
|---|---|---|---|
| 5,781,676 A | 7/1998 | Okada | 385/31 |
| 6,078,708 A | 6/2000 | de la Tocnay et al. | 385/33 |
| 6,141,361 A | 10/2000 | Mears et al. | |
| 6,236,780 B1 | 5/2001 | Wade | 385/37 |
| 6,275,623 B1 | 8/2001 | Brophy et al. | 385/14 |
| 6,289,152 B1 | 9/2001 | Zhang et al. | 385/33 |
| 6,304,692 B1 * | 10/2001 | Sappey et al. | 385/24 |
| 6,337,935 B1 | 1/2002 | Ford et al. | 385/24 |
| 6,415,077 B1 | 7/2002 | Frisken et al. | 385/31 |
| 6,441,959 B1 | 8/2002 | Yang et al. | 359/495 |
| 6,477,293 B1 * | 11/2002 | Golub | 385/24 |
| 6,728,435 B1 * | 4/2004 | Kashihara et al. | 385/24 |
| 6,836,591 B1 * | 12/2004 | Kashihara et al. | 385/37 |
| 2002/0015559 A1 * | 2/2002 | Kashihara et al. | 385/37 |
| 2002/0081070 A1 | 6/2002 | Tew | 385/39 |
| 2002/0110320 A1 | 8/2002 | Carlisle et al. | 385/33 |

\* cited by examiner

*Primary Examiner*—John D. Lee
(74) *Attorney, Agent, or Firm*—Workman Nydegger (57) ABSTRACT

A system and method for wavelength division multiplexing and demultiplexing with broadened and flattened passband profiles are disclosed. A spectral modifying element may be used to broaden and flatten the passband profile of associated multiple wavelength optical signals and spectral components. The system preferably includes a light focusing device and a diffraction grating having a direction of dispersion. The spectral modify element primarily transforms or broadens and flattens optical signals in only the direction of dispersion of the associated diffraction grating.

21 Claims, 6 Drawing Sheets

SYSTEM AND METHOD FOR CONTROLLING SPECTRAL PASSBAND PROFILE

RELATED APPLICATION

This application claims priority from U.S. Provisional Application No. 60/301,322 filed on Jun. 27, 2001 and entitled "System and Method for Controlling Spectral Passband Profile."

TECHNICAL FIELD OF THE INVENTION

The present invention relates in general to separation of multiple wavelengths into spectral components and, more particularly, to controlling spectral passband profile during wavelength division multiplexing and demultiplexing associated with optical communication systems and separation of wavelengths in spectral analysis.

BACKGROUND OF THE INVENTION

The increased demand for data communication and the remarkable growth of the internet have resulted in increased demand for communication capability within metropolitan areas. There has also been an equally large increase in demand for communication capability between large metropolitan areas. Optical communication systems using a network of fiber optic cables are being developed and installed to meet the increased demand.

The data transmission capacity of fiber optic cables and fiber optic networks has been substantially increased as a result of wavelength division multiplexing (WDM) and dense wavelength division multiplexing (DWDM). Within WDM and DWDM systems, optical signals assigned to respective wavelengths are combined (multiplexed) into a multiple wavelength signal for transmission over a single fiber optic cable or other suitable waveguide. A typical DWDM system modulates multiple data streams on to different portions of the light spectrum. For example, one data stream may have an assigned wavelength of 1543 nanometers (nm) and the next data stream may have an assigned wavelength of 1543.8 nm. The required spacing between assigned wavelengths is generally established by International Telecommunications Union (ITU) specifications. These spacings include 0.4 nm and 0.8 nm.

Wavelength division demultiplexing (WDDM), the reverse process of multiplexing, typically refers to separation of a multiple wavelength signal transmitted by a single optical fiber or other suitable waveguide into constituent optical signals for each wavelength. Each optical signal may be further processed to obtain the associated data stream or other information. Both multiplexing and demultiplexing are required for satisfactory operation of WDM and DWDM systems. Multiplexing and demultiplexing of optical signals in conventional DWDM systems are typically performed by two separate optical devices which are relatively expensive and often difficult to manufacture.

Typical grating based spectrum analyzers and wavelength division multiplexers and demultiplexers that use optical fibers or other types of waveguides have passbands or spectral responses that are generally highly peaked with a slow roll off in their wavelength response. This characteristic results from diffraction response of the associated grating element that separates the wavelengths and transmission response of intervening optical lens elements and receiving optics. Such responses (peaked with slow roll off) do not use the full bandwidth of most multiplexers and demultiplexers. As a result it is often difficult to specify wavelength tolerances for associated components such as laser light sources, amplifiers and other optical components.

Various techniques may be used to transform or defocus multiple wavelength optical signals to achieve some spectral broadening. Previously available techniques and procedures generally create significant losses due to spreading of the multiple wavelength signals in directions which are both parallel and perpendicular to the direction of dispersion. Therefore, transforming or defocusing multiple wavelength optical signals has generally been avoided for most optical communication systems.

For conventional multiplexers and demultiplexers, the width of each passband profile for associated optical signals generally corresponds with the core diameter of respective input and output optical elements. If the diameter of a core is approximately equal to ten micrometers (10 μm), the passband profile of an associated optical signal would often be ten micrometers or less in spatial domain which is relatively small. Sometimes, the thickness of the associated cladding layers may be reduced to increase the core-to-cladding diameter ratio at the input or output and thus the associated passbands profile.

SUMMARY OF THE INVENTION

In accordance with teachings of the present invention, a system and method for wavelength division multiplexing and demultiplexing are disclosed that provide significant advantages over conventional approaches. One aspect of the present invention includes a system and method that will broaden and flatten passbands associated with a multiple wavelength division multiplexer and/or a multiple wavelength division demultiplexer to allow greater bandwidth utilization without adding significant optical losses in associated optical devices. Another aspect of the present invention includes a system and method that will broaden and flatten passbands associated with the separation of wavelengths in any type of spectral analysis.

One aspect of the present invention includes transforming optical signals by defocusing or spreading to achieve desired spectral broadening without significantly increasing losses from the defocusing. One embodiment includes a system for wavelength division demultiplexing having an input fiber optic element or waveguide operable to transmit multiple wavelength optical signals. The system may also include a light focusing device with the input fiber optic element oriented to project multiple wavelength optical signals through the light focusing device. An additional element may be a diffraction grating positioned to receive multiple wavelength optical signals from the light focusing device and to separate or disperse the multiple wavelength optical signals into its associated spectral components. Each spectral component may correspond with one channel of an associated fiber optic communication system. A spectral modifying element may be used to defocus the light focusing device to achieve an optimum amount of spectral broadening in the direction of dispersion of the diffraction grating. The spectral components may be directed from the diffraction grating through the light focusing device and the spectral modifying element to respective output fiber optic elements or waveguides.

A spectral modifying element formed in accordance with teachings of the present invention will preferably defocus or spread optical signals only along the direction of dispersion of the associated diffraction grating to provide desired spectral broadening or passband broadening without increasing signal level losses as compared with conventional defocusing techniques. The present invention includes contouring spectral modifying elements such that the spectral response for an optical signal may be flattened as well as broadened. Examples of spectral modifying elements which may be used to control or modify spectral passband profiles in accordance with teachings of the present invention include, but are not limited to, circular and aspherical cylindrical lenses or surfaces (e.g., diffractive elements), tilted flat plates, and toroidal lenses or surfaces.

Another embodiment of the present invention includes a system for wavelength division multiplexing having an array of input fiber optic elements or waveguides operable to transmit respective optical signals. The system may also include a light focusing device with the input fiber optic elements oriented to project their respective optical signals through the light focusing device. An additional element may be a diffraction grating positioned to receive the multiple optical signals from the light focusing device. A spectral modifying element formed in accordance with teachings of the present invention may be used to defocus the light focusing device to achieve an optimum amount of spectral broadening for each optical signal and the resulting multiple wavelength optical signal. The diffraction grating preferably combines the respective optical signals into a single multiple wavelength optical signal. The multiple wavelength optical signal is then directed through the light focusing device and spectral modifying element to an output fiber optic element or waveguide.

Technical advantages of a system and method formed in accordance with teachings of the present invention include broadening and flattening the passband profile for each channel associated with typical multiple wavelength division multiplexers and multiple wavelength division demultiplexers used with optical communication systems or networks without substantially increasing insertion losses associated with the multiplexer and/or demultiplexer. Broadening and flattening each channel passband profile in accordance with teachings of the present invention allows reducing tolerance specifications on optical signal sources and substantially reduces the effects of bandwidth narrowing which may occur during a series of multiplexing and/or demultiplexing procedures in an optical communication system or network.

A spectral modifying element formed in accordance with teachings of the present invention may be used to both broaden and flatten passband profiles of optical signals associated with multiplexers, demultiplexers or other spectral analyzing devices.

Other technical advantages will be apparent to those of ordinary skill in the art in view of the following specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments and their advantages are best understood by reference to FIGS. 1 through 11, wherein like numbers are used to indicate like and corresponding parts.

The terms "optical signal or signals" and "light signal or signals" are used in this application to include the full range of all electromagnetic radiation which may be satisfactorily used to communicate information through a waveguide and/or fiber optic cable. Spectral modifying elements incorporating teachings of the present invention may be satisfactorily used to transform, blur, defocus, or spread optical signals along a selected direction in the infrared, visible and ultraviolet spectrum and increase the passband profile for such signals.

The term "multiplexer" is used in this application to mean a multiple wavelength division multiplexer satisfactory for use in optical communication systems and networks such as local area optical networks, wide area optical networks, long haul optical networks, metropolitan area networks and last mile connections for users of such networks. The term "demultiplexer" is used in this application to mean a multiple wavelength division demultiplexer satisfactory for use in optical communication systems and networks such as local area optical networks, wide area optical networks, long haul optical networks, metropolitan area networks and last mile connections for users of such networks.

The term "passband" is used in this application to mean the frequency span or range of frequencies of an optical signal that may be communicated through an optical fiber, waveguide or other components of an optical communication system or network. Passband may also be defined by a range of wavelengths corresponding with the respective range of frequencies. Passband is often measured between the points where an optical signal is down three decibels (3 dB) in amplitude/power level or one half the amplitude relative to the maximum overall signal level. The passband for many optical components may be defined as a spectral region or profile having a center wavelength with a width equal to two half bandwidths. The center wavelength generally corresponds with the arithmetic center of the passband and may not always be the peak wavelength of the associated optical signal. A half bandwidth corresponds generally with one half of the maximum overall signal level or a decrease of approximately 3 dB in amplitude. Multiplexers and demultiplexers formed in accordance with teachings of the present invention may include spectral modifying elements that both flatten and broaden passband profiles or spectral regions associated with such multiplexers and demultiplexers without substantially increasing signal losses. The terms "power level", "amplitude", and "signal level" are used interchangeably in this application.

Figure 1:
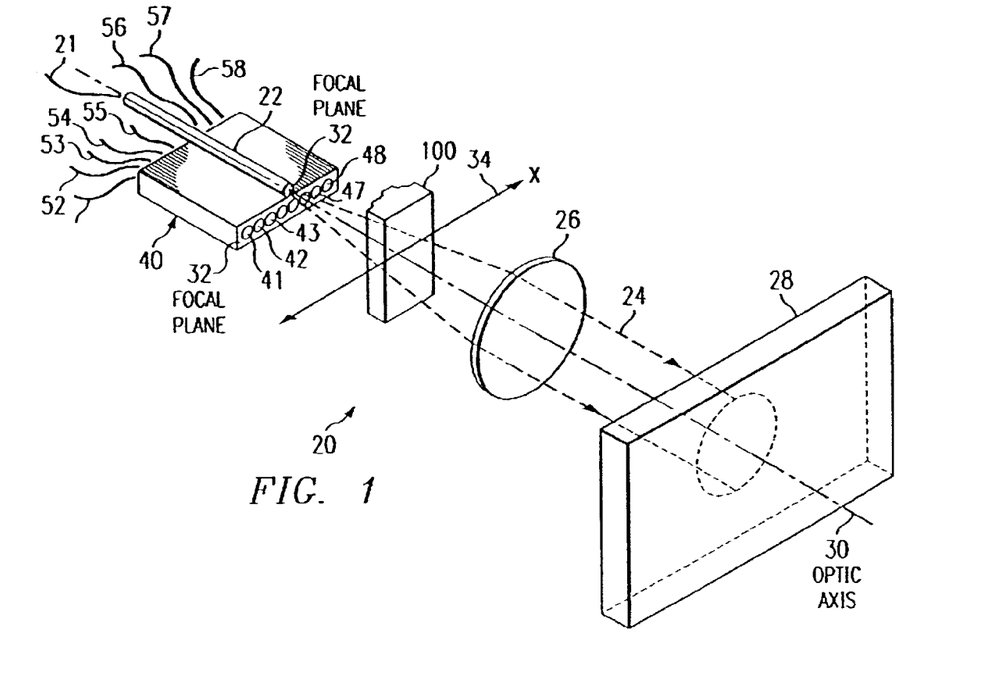
FIG. 1 is a schematic drawing showing one example of an optical communication device such as a multiplexer or demultiplexer formed in accordance with teachings of the present invention.

Various features of the present invention will be described with respect to communication device 20 as shown in FIG. 1 functioning as a demultiplexer. The components associated with communication device 20 include input optical element or waveguide 22, spectral modifying element 100, light focusing device 26, diffraction grating 28 and an array of output optical elements or waveguides 41–48. These components may also cooperate with each other to function as a multiplexer. For purposes of describing some features of the present invention, communication device 20 will be referred to as demultiplexer 20. For one embodiment demultiplexer 20 may have eight (8) channels with nonlinear spacings of approximately 200 GHz. The pitch of the input and output fibers or waveguides may be 130 µm to 165 µm. The components of demultiplexer 20 do not need to be physically separate from one another. For example, light focusing device 26 and diffraction grating 28 may be combined into one component in some embodiments.

Various components associated with demultiplexer 20 are generally aligned with each other along optical axis 30. Diffraction grating 28 is preferably operable to disperse multiple wavelength optical signals into associated spectral components in a direction generally perpendicular to optical axis 30. Although FIG. 1 shows diffraction grating 28 as being positioned so that the plane of diffraction grating 28 that is closest to focusing device 26 is orthogonal to optical axis 30 for clarity of illustration, diffraction grating 28 may in fact be tilted. For example, diffraction grating 28 may be rotated slightly about a vertical axis. "Vertical axis," as used herein, is the axis that is perpendicular to both the direction x and to the direction in which the channels travel in FIG. 1. Respective ends of input optical element 22 and output optical elements 41–48 are preferably disposed on focal plane 32. The relationship between focal plane 32 and the direction of dispersion of diffraction grating 28 will be discussed later in more detail.

Input fiber optic cable 21 supplies multiple wavelength optical signals 24 to input optical element 22. Input optical element 22 may be formed as an integral part of input fiber optic cable 21. For some applications input optical element 22 may have substantially the same core 22a, layer of cladding 22b and layer of coating 22c (see FIGS. 2A and 2B) as input fiber optic cable 21. Typical dimensions for a single mode fiber optic cable which may be satisfactorily used as input fiber optic cable 21 include a core diameter of approximately ten micrometers (10 µm), a cladding layer diameter of approximately one hundred twenty five micrometers (125 µm) and a coating layer diameter of approximately two hundred fifty micrometers (250 µm). For other applications input optical element 22 may have a core and layer of cladding with generally square or rectangular cross sections (not expressly shown). Various commercially available techniques may be used to couple input fiber optic cable 21 with input optical element 22. Preferably, the core-to-cladding diameter ratio is higher than the ratio resulting from the typical dimensions. A higher core-to-cladding diameter ratio may be achieved in a number of ways including but not limited to etching the fiber cladding to reduce its diameter, enlarging the core size with lens elements, and using tapered waveguides.

Wavelength division multiplexing (WDM) techniques may be used to allow input fiber optic cable 21 to carry multiple wavelength optical signals which substantially increases the efficiency of fiber optic cable 21. Recently, dense wavelength division multiplexing (DWDM) techniques have been developed to allow existing fiber optic networks to better satisfy the increased demand for communication capabilities.

During operation of demultiplexer 20, input optical element 22 preferably projects multiple wavelength optical signal 24 through light focusing device 26 to diffraction grating 28. For some applications light focusing device 26 may include a plurality of collimating and focusing lenses (not expressly shown). In other embodiments, light focusing device 26 may include a single biconvex lens or any other device operable to collimate diverging light and focus collimated light (not expressly shown). Diffraction grating 28 will preferably disperse multiple wavelength optical signal 24 into its respective channels or spectral components in a direction general perpendicular to optical axis 30 and parallel with focal plane 32. The direction of dispersion (x) associated with diffraction grating 28 is shown by arrows 34 in FIGS. 1, 2A and 2B.

Figure 5:
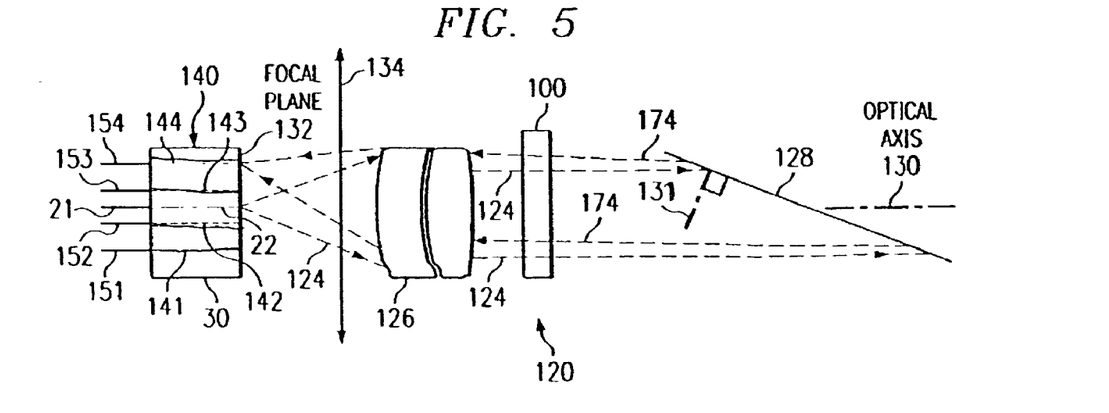
FIG. 5 is a schematic drawing showing another embodiment of an optical communication device formed in accordance with teachings of the present invention.
Figure 6:
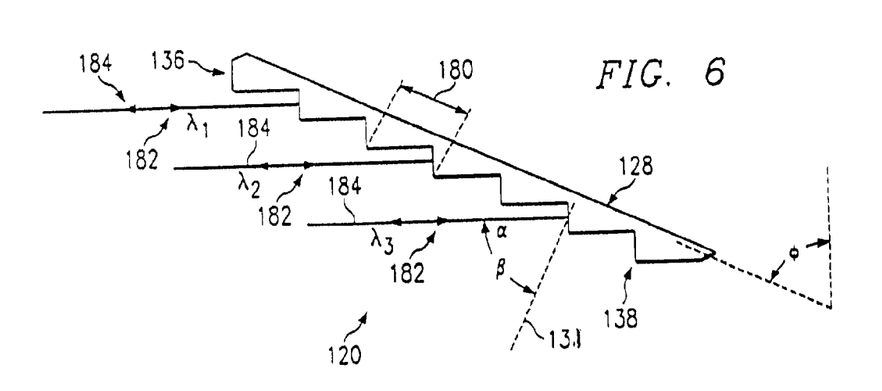
FIG. 6 is schematic drawing in section showing portions of a diffraction grating associated with the optical communication device of FIG. 5.

For some embodiments, diffraction grating 28 may be a Littrow configuration or assembly. For example, diffraction grating 28 may be positioned in an over and under Littrow configuration or assembly, such as shown in FIGS. 5 and 6. For other embodiments, diffraction grating 28 may be a Litmann-Metcalf configuration or assembly (not expressly shown). In yet other embodiments, diffraction grating 28 may be one or more transmission gratings (e.g., surface relief elements) that perform the desired dispersion. Other types of diffraction gratings and assemblies associated with multiplexers and demultiplexers may be satisfactorily used with the present invention.

For the embodiment shown in FIG. 1, multiple wavelength optical signal 24 may have eight spectral components. Each spectral component of multiple wavelength optical signal 24 may also be referred to as a "channel". Line spacing is often defined as the distance in wavelength units (nim) or in frequency units (GHz) between two channels or spectral components. Line spacing may also be referred to as "channel spacing" or "channel separation." Forty (40) channel DWDM systems typically have channel spacing of approximately 100 GHz. Eighty (80) channel DWDM systems typically have channel spacing of approximately 50 GHz.

An array of output optical elements or waveguides 41–48 is provided to respectively receive one of the spectral components or channels associated with multiple wavelength optical signal 24. The spectral components or channels (not expressly shown) are directed from diffraction grating 28 through light focusing device 26 and spectral modifying element 100 to respective output optical elements 41–48.

Output optical elements 41–48 may be formed as integral parts of respective output fiber optic cables 51–58. For some applications output optical elements 41–48 may have substantially the same cores 41a–48a, layer of cladding 41b–48b and layer of coating 41c–48c as previously described with respect to input optical element 22. For other applications, output optical elements 41–48 may have a core and layer of cladding with generally square cross or rectangular sections. Various commercially available techniques may be used to couple output fiber optic cables 51–58 with respective output optical elements 41–48.

Other embodiments of the present invention may include more or less spectral components or channels. For example, one embodiment of the present invention may be used with multiple wavelength optical signals having thirty two spectral components ranging from 1540 to 1570 nanometers (nm). The spacing between each spectral component may be 0.8 nm though other spacings are possible such as 0.4 nm. The location of output optical elements 41–48 relative to each other may be based in part on the grating equation for diffraction grating 28 and the spacing between the spectral components.

Input optical element 22 is shown in FIG. 1 disposed above output optical elements 41–48 and extending generally parallel with optical axis 30. For some applications, an input optical element may be positioned at one end of an array of output optical elements to form a demultiplexer in accordance with teachings of the present invention. For other applications, an output optical element may be positioned at one end of an array of input optical elements to form a multiplexer in accordance with teachings of the present invention.

For the embodiment of the present invention as shown in FIG. 1, spectral modifying element 100 may be disposed between focal plane 32 and light focusing device 26. For other applications, spectral modifying element 100 may be disposed between light focusing device 26 and diffraction grating 28. See FIG. 5. For still other applications one or more surfaces of light focusing device 26 may be modified to include a spectral modifying element formed in accordance with teachings of the present invention such as a toric lens element (not expressly shown).

Figure 2A:
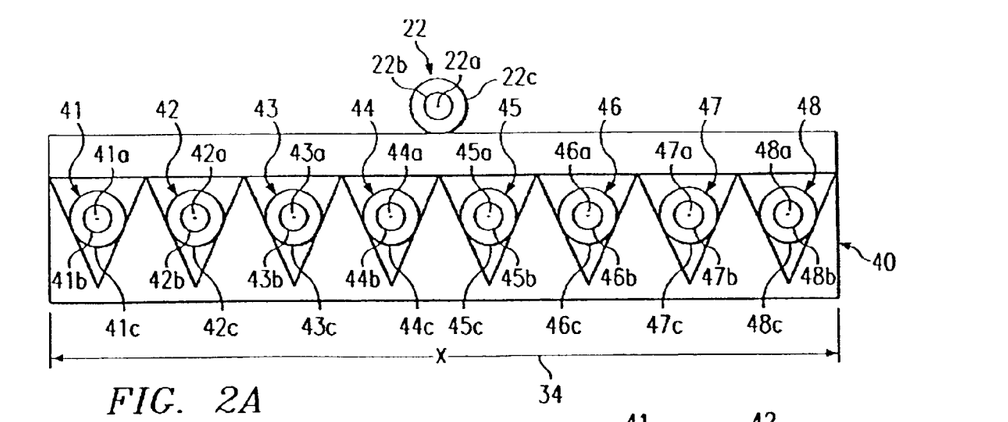
FIG. 2A is a schematic drawing in elevation showing an end view of an optical input element and optical output elements associated with the optical communication device of FIG. 1.
Figure 2B:
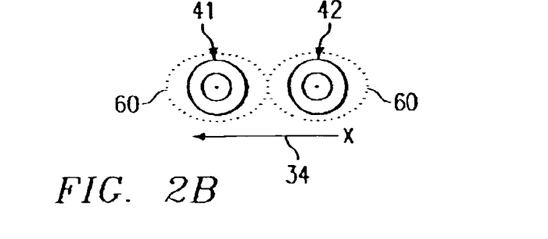
FIG. 2B is a schematic drawing showing an end view of two optical output elements of FIG. 2A and passband profiles for respective spectral components which have been flattened and broadened in accordance with teachings of the present invention.

Spectral modifying element 100 will preferably blur or spread multiple wavelength optical signal 24 primarily in the direction of dispersion of diffraction grating 28 (see direction x in FIGS. 1, 2A and 2B). Spectral modifying element 100 may also blur or spread each spectral component primarily in the direction of dispersion of diffraction grating 28 as each spectral component travels from light focusing device 26 to the respective output optical elements 41–48. Spectral modifying element 100 transforms the associated optical signals by selectively blurring the optical signals in the direction of dispersion. This blurring in the selective direction is achieved because spectral modifying element 100 has a focal length in the vertical direction that is different from its focal length in the horizontal direction.

For some applications this transformation of the optical signals may also be referred to as "blurring" or "dispersion." Normally optical communication systems and particularly fiber optic cables are designed to minimize any blurring or dispersion of the associated optical signals. Spectral modifying element 100 is preferably designed in accordance with teachings of the present invention to result in only a very small amount of blurring or dispersion in a direction perpendicular to the direction of dispersion 34, for example in the direction of optical axis 30. One goal is to have substantially no dispersion in the direction perpendicular to the direction of dispersion, such as in the direction of optical axis 30. Teachings of the present invention may be used to form spectral modifying elements which primarily blur or disperse optical signals in only the direction of dispersion of an associated diffraction grating.

For some applications multiple wavelength optical signal 24 will have a generally Gaussian beam profile as projected from input optical element 22. Spectral modifying element 100 will preferably flatten and broaden multiple wavelength optical signal 24 to form a beam profile having a more rectangular configuration. Spectral modifying element 100 may also further flatten and broaden each spectral component to form a beam profile having an even more rectangular configuration. Spectral modifying element 100 will preferably broaden and flatten the passband profile for each spectral component received by output optical elements 41–48 as optical signals are sent to and returned from diffraction grating 28.

Each of the optical output elements 41–48 may be disposed within V-groove assembly 40 at a location corresponding with the respective spectral component returned from diffraction grating 28. Each optical output elements 41–48 is preferably coupled with a respective output fiber optic cable 51–58. For some applications output optical elements 41–48 may have cores 41a–48a with diameters of approximately 10 micrometers (10 μm), cladding layers 41b–48b with diameters of approximately one hundred twenty five micrometers (125 μm) and coating layers 41c–48c with diameters of approximately two hundred fifty micrometers (250 μm ).

As previously noted, spectral modifying element 100 will preferably transform multiple wavelength optical signal 24 in the direction of dispersion as multiple wavelength signal 24 is communicated from input optical element 22 to light focussing device 26. Spectral modifying element 100 will also preferably transform each spectral component transmitted from diffraction grating 28 to the respective output optical element 41–48. By forming spectral modifying element 100 in accordance with teachings of the present invention, the spectral component received at each output optical element 41–48 may have a passband profile with a generally oval shaped configuration 60 such as shown in FIG. 2B with broken lines. A person of ordinary skill in the art will appreciate that the passband shape may be changed from oval to a different shape by using the current invention. The size of the new passband profile may be larger than, smaller than, or substantially the same as the passband profile prior to the manipulation, depending on the application. The location of spectral modifying element 100 and its associated dimensions are preferably selected in accordance with teachings of the present invention-such that passband profiles 60 do not overlap with each other which minimizes cross talk between adjacent output optical elements 41–48.

Figure 3:
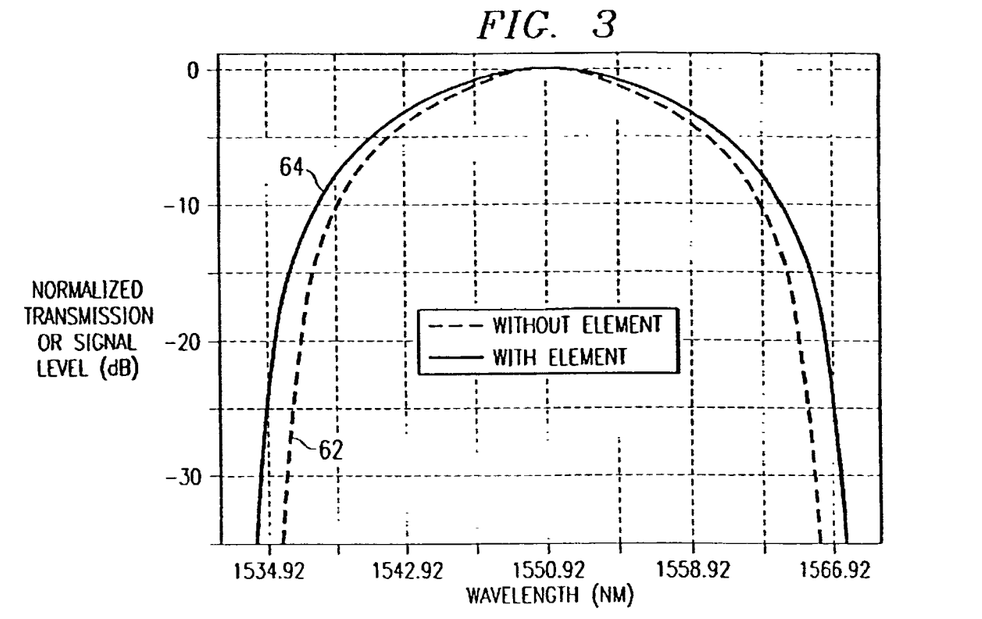
FIG. 3 is a graph showing changes in the passband profile of a spectral component resulting from including a spectral modifying element in the communication device of FIG. 1.
Figure 4A:
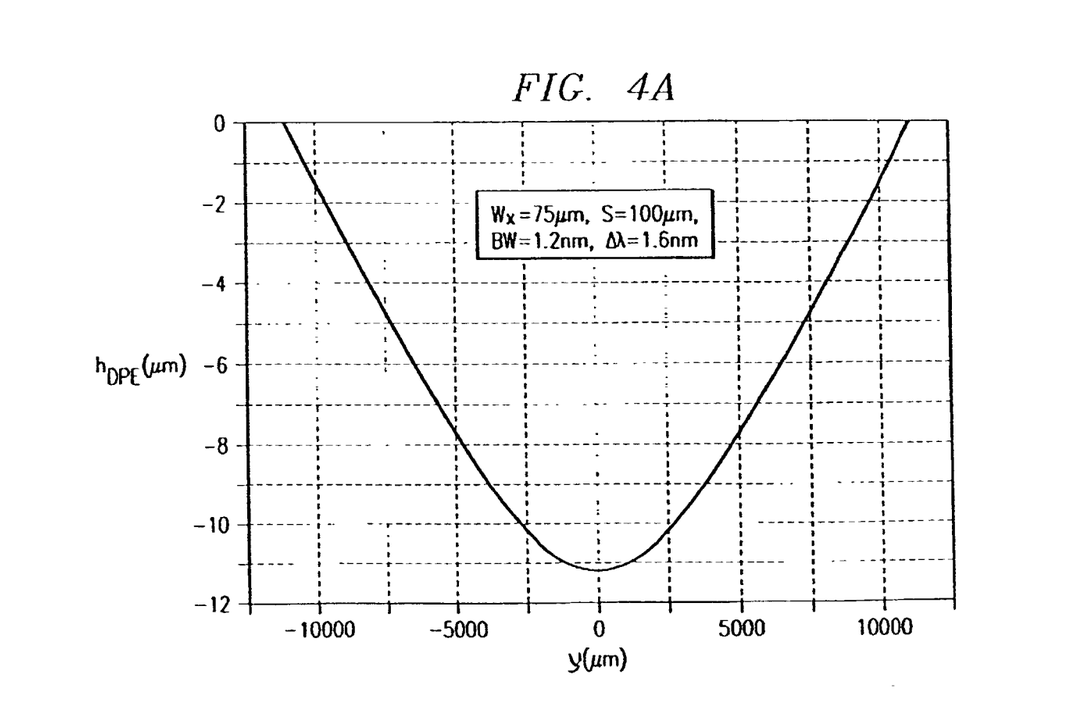
FIG. 4A is a graph showing one example of an aspherical lens surface formed on a spectral modifying element in accordance with teachings of the present invention.
Figure 4B:
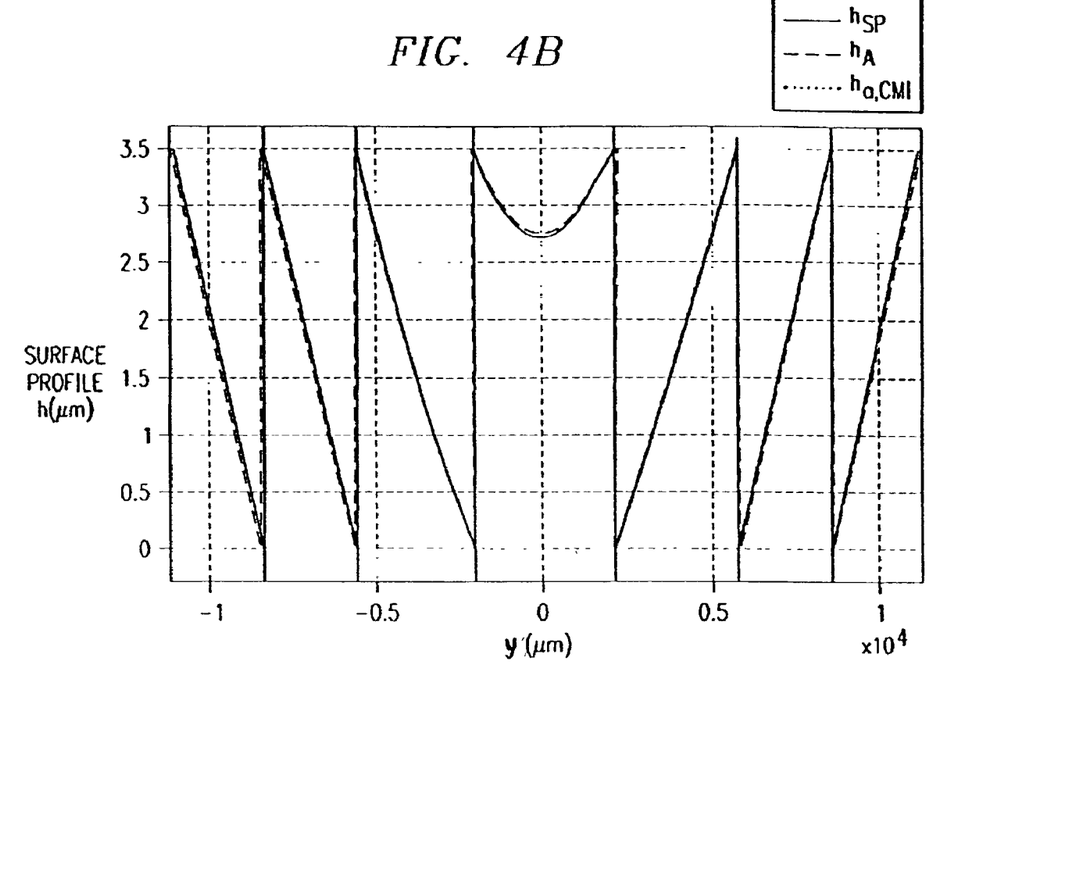
FIG. 4B is a graph showing another example of a surface profile formed on a spectral modifying element in accordance with teachings of the present invention.

FIG. 3 is a graphical representation that spectral components or passband profiles may be both broadened and flattened using a refractive or diffractive aspheric cylindrical lens formed in accordance with teachings of the present invention as spectral modifying element 100. FIG. 3 shows calculated results when an aspherical curved surface such as shown in FIG. 4A or a surface profile such as shown in FIG. 4B with a dashed line is formed on a cylindrical lens or diffractive elements to be used as the directrix of a right cylinder, as part of spectral modifying element 100. FIG. 4A shows a lens curved surface with bilateral symmetry about the vertical axis. The cylindrical lens shown in FIG. 4A is a right circular cylinder having an aspherical profile, which is sometimes referred to as an aspheric cylinder. A person of ordinary skill in the art would appreciate that curved refractive elements may be replaced by their diffractive analogues on flat substrates. For example, the solid curve in FIG. 4B is a diffractive analogue of a circular directrix, while the dashed curve in FIG. 4B is the diffractive analogue of an aspheric directrix.

In some embodiments, spectral modifying element 100 is a cylindrical lens that has different focal lengths in the vertical direction than the direction in which light propagates. In these embodiments, the amount of blurring or dispersion that is achieved may be controlled by adjusting the difference in focal length in the two directions.

For some applications one or more surfaces associated with light focusing device 26 may be formed with a cylindrical surface with an aspheric profile such as shown in FIGS. 4A or a surface profile such as shown in FIG. 4B with a dashed line. FIG. 4A and FIG. 4B show the height of a lens surface as a function of distance "y" along one side of the lens. As long as light focusing device 26 has a surface profile substantially similar to what is shown in FIG. 4A and FIG. 4B, the direction in which light focusing device 26 faces is immaterial. For example, the system may be optimized for a particular result regardless of whether the surface having the profile in FIG. 4A faces optical plane 32 or diffraction grating 28. Also, the surface having the profile shown in FIG. 4A or FIG. 4B may be independently constructed on a plate or combined with another lens.

Line 62 of FIG. 3 is a representation of signal level versus wavelength for a spectral component received by one of the output optical elements 41–48 without the presence of spectral modifying element 100. Line 64 is a representation of signal level versus wavelength for a spectral component received by one of the output optical elements 41–48 when spectral modifying element 100 having an aspheric cylindrical surface such as shown in FIG. 4A is disposed between light focusing device 26 and diffraction grating 28, or just in front of light focusing device 26.

The center wavelength of the spectral component used to obtain the data represented by the graphs shown in FIG. 3 (in one specific application) was approximately 1550.92 nanometers (nm). When spectral modifying element 100 was not present, the half bandwidth for the spectral component at minus 3 dB was approximately 1544 nanometers to 1557 nanometers. When spectral modifying element 100 was installed, the half bandwidth increased to approximately 1542.92 to 1558.92 nanometers. At a signal level of minus 0.5 dB the passband profile or broadening of the spectral component increased by approximately fifty seven percent (57%). Insertion loss along optical axis 30 increased by approximately 0.73 dB when spectral modifying element 100 was installed between light focusing device 26 and the diffraction grating 28. The broadening effect is similar or may be better in other applications. Optical signals can be both broadened and flattened as shown in FIG. 3.

An alternative embodiment of the present invention represented by demultiplexer 120 is shown in FIG. 5. Demultiplexer 120 preferably includes input fiber optic cable 21, input optical element 22, light focussing device 126, spectral modifying element 100, diffraction grating 128 and an array of output optical elements 141–144. Various components associated with demultiplexer 120 are generally aligned with each other along optical axis 130. The end of input optical element 22 and the ends of output optical elements 141–144 are preferably aligned with focal plane 132. During the operation of demultiplexer 120, input optical element 22 projects multiple wavelength optical signal 124 through light focusing device 126 to diffraction grating 128. Light focusing device 126 may be formed from a wide variety of collimating and focusing lenses or other devices satisfactory to collimate diverging light and focus the collimated light.

For the embodiment shown in FIG. 5, multiple wavelength optical signal 124 may have four spectral components. Each spectral component of multiple wavelength optical signal 124 may also be referred to as a channel. Output optical elements 141–144 are provided to respectively receive one of the spectral components or channels associated with multiple wavelength optical signal 124. The individual spectral components or channels (not expressly shown) are directed from diffraction grating 128 through spectral modifying element 100 and light focussing device 126 to respective output optical elements 141–144.

Diffraction grating 128 includes grating normal 131 (shown in FIGS. 5 and 6). From grating normal 131, an angle of incidence for multiple wavelength optical signal 124 striking diffraction grating 128 and an angle of diffraction for each spectral component diffracting from diffraction grating 128 may be measured. Only one spectral component 174 is shown in FIG. 5. For one embodiment, the angle of incidence and the angle of diffraction may be equal or approximately equal. Diffraction grating 128 may be positioned in an over and under Littrow configuration. As such, each spectral component diffract from diffraction grating 128, under incident multiple wavelength optical signal 124, through light focusing device 26, toward output optical elements 141–144.

FIG. 6 is a schematic drawing showing an enlarged sectional view of diffraction grating 128, which may be used with multiplexers or demultiplexers that incorporate teachings of the present invention. Diffraction grating 128 may include blazed surface 136. Diffraction grating 128 may be made from any number of materials. For example, diffraction grating 128 may be made of glass and have an aluminum blazed surface. In some embodiments, blazed surface 136 may have a silicon monoxide (SiO) coating. Such diffraction gratings may be supplied by Richardson Grating Laboratory of Rochester, N.Y., as part number 1319LE-415.

Blazed surface 136 may have peaks 138 spaced a uniform distance 180 from one another. Distance 180 may be used to define the groove density of diffraction grating 128. Typically, groove density, G, is defined by the equation $G=1/d$, where $d$=the distance indicated by distance 180 (i.e., groove spacing). Groove density often has a large impact on the efficiency and the polarization sensitivity of a diffraction grating. As groove density increases and the spacing between grooves narrows to three times or less the wavelength of the light being diffracted, polarization dependent loss (PDL) begins to occur. This is a common problem facing conventional multiplexing and demultiplexing devices.

Grating normal 131 may provide a reference axis for calculating an angle of incidence and an angle of diffraction for incident rays 182 and diffracted rays 184. When blazed surface 136 receives incident rays 182, which may be of differing wavelengths (e.g., λ1 through λ3), these rays may be diffracted (i.e., bounced off blazed surface 136). The angle between grating normal 131 and incident rays 182 may be measured to define an angle of incidence, I. Similarly, the angle between grating normal 131 and diffracted rays 184 may be measured to define an angle of diffraction, ∂.

In the embodiment depicted in FIG. 6, α and β may approximate one another. In addition, α and β preferably approximate mounting angle, φ, which represents the angle between grating normal 131 and optical axis 130 of demultiplexer 120. Optical axis 130 may be defined in part by light focusing device 126. In one embodiment, α, β and φ may all be greater than fifty degrees. In a preferred embodiment, α, β and φ may all fall between approximately sixty-two and sixty-six degrees. In another, they may approximately be 25° to 38°.

Diffraction grating 128 may also have a diffraction order. This diffraction order, m, may be defined by the grating equation:

$$\frac{m\lambda}{d} = \eta_i \sin\alpha + \eta_0 \sin\beta$$

where
m=0, ±1, ±2, ±3, ...
λ=the wavelength of light diffracted (e.g., 1550 ηm)
d=groove spacing
G=groove density=1/d
α=angle of incidence
β=angle of diffraction
ηi=refractive index of the medium light travels through in order to arrive at the diffraction grating
ηo=refractive index of the medium light travels through after leaving the diffraction grating For some applications, diffraction grating 128 may have a diffraction order greater than one. In preferred embodiments, diffraction grating 128 may have a diffraction order greater than fourteen. At diffraction orders near fourteen and higher, PDL may decrease and efficiencies may improve. This may happen because higher diffraction orders (e.g., 14 and larger) allow for an increase in groove spacing and a resulting decrease in groove density.

For example, when solving for groove spacing in air, d, with a diffraction order of twenty-two, a wavelength of 1550 nm, and α≅β≅64.1 degrees, the grating equation yields a groove spacing approximately equal to nineteen micrometers (19 μm). This groove spacing results in negligible PDL and high efficiencies, because it is approximately twelve times the wavelength.

Figure 7:
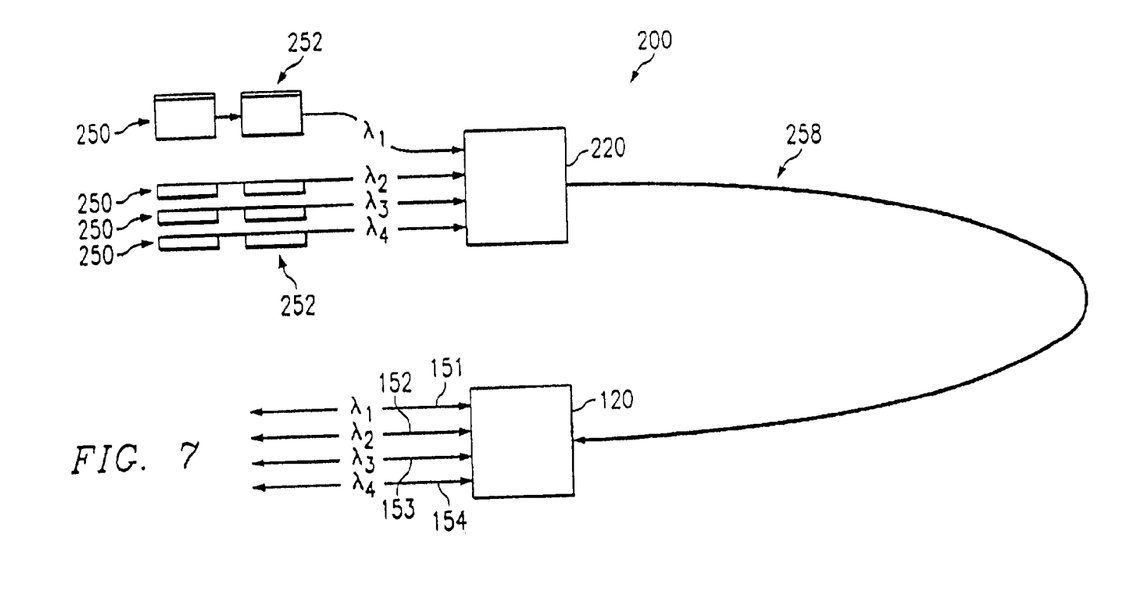
FIG. 7 is a schematic drawing of an optical communication system having a multiplexer and demultiplexer with spectral modifying elements formed in accordance with teachings of the present invention.

FIG. 7 is a schematic drawing showing representative portions of optical communication system 200 incorporating teachings of the present invention. In operation, power supplies 250 may be operable to power and modulate tuned lasers 252. Tuned lasers 252 may be tuned to project a beam of light at a specified assigned wavelength (e.g., $\lambda_1$, which may equal 1543 nm). As depicted, optical communication system 200 includes four power supplies and four tuned lasers generating light in four distinct wavelength ranges or spectral components. In other embodiments, an optical communication system may include a different number of power supplies, lasers, and wavelengths. Increasing the passband profile of optical signals associated with optical communication system 200 in accordance with teachings of the present invention allows tolerance specifications for power supplies 250 and tuned lasers 252 to be reduced or lowered. As a result, the cost of such power supplies and lasers may be reduced along with associated maintenance requirements.

Optical communication system 200 may include demultiplexer 120 and multiplexer 220. Demultiplexer 120 and multiplexer 220 may have substantially the same components. In multiplexer 220, previously described input optical element 22 may function as an output optical element coupled with fiber optic cable 258. In multiplexer 222, previously described output optical elements 141, 142, 143 and 144 may function as respective input optical elements for respective spectral components $\lambda_1, \lambda_2, \lambda_3$, and $\lambda_4$.

Four distinct wavelength ranges or spectral components $\lambda_1, \lambda_2, \lambda_3$, and $\lambda_4$, may enter multiplexer 220 incorporating teachings of the present invention. Once inside, spectral components $\lambda_1, \lambda_2, \lambda_3$, and $\lambda_4$ may be projected through spectral modifying element 100 to diffraction grating 128. Diffraction grating 128 may combine spectral components $\lambda_1, \lambda_2, \lambda_3$, and $\lambda_4$ in accordance with the grating equation and direct the combined signal to light focusing device 126 and spectral modifying element 100. Light focusing device 126 may collimate and focus the combined spectral components $\lambda_1, \lambda_2, \lambda_3$, and $\lambda_4$ as a multiple wavelength optical signal. The multiple wavelength optical signal with a flattened and broadened passband profile may be received by optical element 22 and communicated to fiber optic cable 258.

Input optical element 22 of demultiplexer 120 may also be coupled with fiber optic cable 258 to receive multiple wavelength optical signals communicated from multiplexer 220. Demultiplexer 120 may then be used to demultiplex the multiple wavelength optical signals and direct each spectral component $\lambda_1, \lambda_2, \lambda_3, \lambda_4$ to respective output fiber optic cables 151, 152, 153 and 154.

Figure 8:
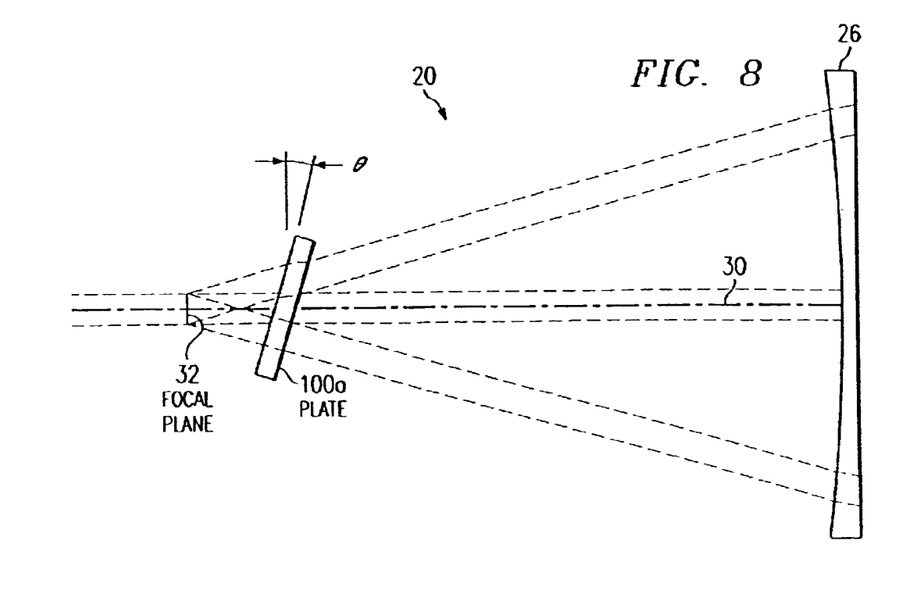
FIG. 8 is a schematic drawing showing portions of the optical communication device of FIG. 1 with another spectral modifying element formed in accordance with teachings of the present invention.

FIG. 8 is a schematic drawing showing portions of demultiplexer 20 with spectral modifying element 100a formed in accordance with teachings of the present invention. For this embodiment spectral modifying element 100a is preferably disposed between focal plane 32 and light focusing device 26. Spectral modifying element 100a may be a generally flat, rectangular plate. For some applications, spectral modifying element 100a is preferably oriented at an angle of approximately θ relative to optical axis 30, wherein θ is typically between 12° and 30°.

Figure 9:
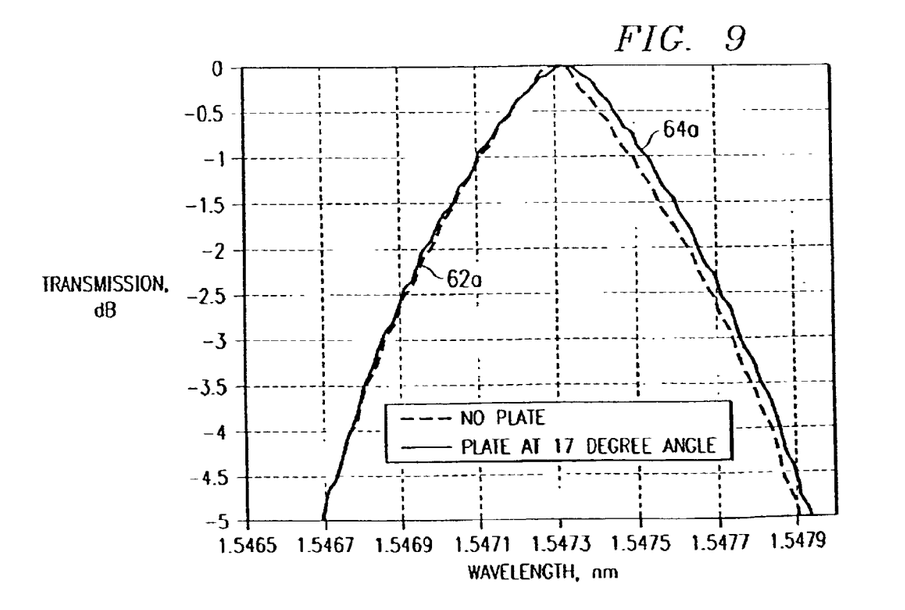
FIG. 9 is a graph showing the effects of the spectral modifying element of FIG. 8 on the passband profile of a spectral component associated with the communication device of FIG. 1.

The calculated response from installing spectral modifying element 100a at an angle of approximately seventeen degrees (17°) relative to optical axis 30 in demultiplexer 20 is shown in FIG. 9. Line 62a is a representation of signal level versus wavelength for a spectral component received by one of the fiber output optical elements 41–48 when spectral modifying element 100a is removed. The center wavelength for the spectral component used to obtain the information shown in FIG. 9 is approximately 1547.3 nm. Line 64a is a calculated representation of signal level versus wavelength for the same spectral component when spectral modifying element 100a is disposed between focal plane 32 and light focusing device 126. The calculations for FIG. 9 utilized a multimode input fiber with a 62.5-μm core diameter. The output receivers were multimode fibers with a 62.5-μm core diameter, a thinned cladding, and a spacing of about 90 μm between the centers of adjacent fibers.

The calculated results indicate that spectral modifying element 100a will result in passband broadening of approximately twenty-six percent (26%) at 0.5 dB below the peak signal level. Line 62a and 64a shown in FIG. 9 have been normalized. The calculated loss from installing spectral modifying element 100a is only approximately 0.7 dB at the peak transmission as compared with transmission losses when no spectral modifying element is installed within demultiplexer 20.

Figure 10A:
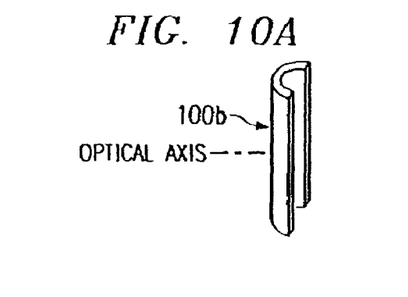
FIG. 10A is a schematic drawing showing an isometric view of another example of a spectral modifying element formed in accordance with teachings of the present invention.
Figure 10B:
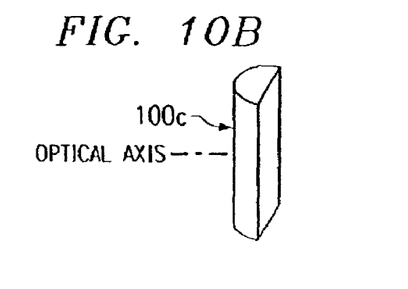
FIG. 10B is a schematic drawing showing an isometric view of still another example of a spectral modifying element formed in accordance with teachings of the present invention.

FIGS. 10A and 10B are schematic drawings showing spectral modifying elements 100b and 100c incorporating teachings of the present invention. Spectral modifying element 100b may be described as a long focal length lens formed from a segment of a circular, hollow cylinder. Spectral modifying element 100c may be described as a long focal length lens formed from a segment of a circular, solid cylinder. When spectral modifying elements 100b or 100c are disposed between diffraction grating 128 and light focusing device 126, the calculated passband increased by almost one hundred percent at 0.5 db down from the peak power level. Additional insertion loss for spectral modifying elements 100b and 100c was calculated at only approximately 1 dB. A person of ordinary skill in the art will appreciate that an optimal configuration is achievable with spectral modifying element 100b or 100c facing any direction. For example, in one embodiment, the curved side of spectral modifying element 100b or 100c may be facing optical plane 32. In another embodiment, the curved side may be facing the diffraction grating. Furthermore, the spectral modifying element may have a convex surface in combination with a surface of any other shape. For example, a convex-convex lens, a convex-concave lens, or a convex-flat lens may be used.

Figure 11:
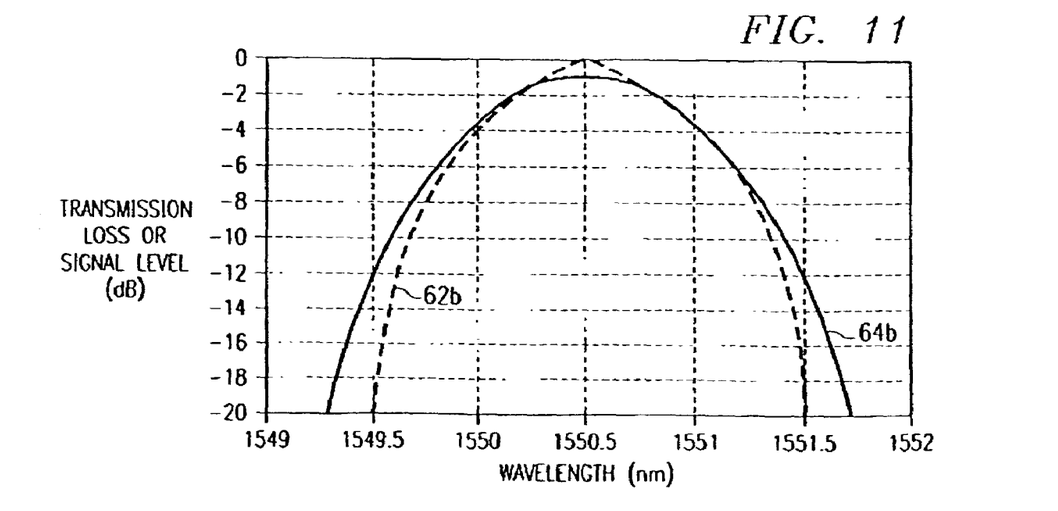
FIG. 11 is a graph showing the effects of spectral modifying elements such as shown in FIGS. 10A and 10B on the passband profile of a spectral component associated with the communication device of FIG. 1.

FIG. 11 is a graphical representation showing the anticipated changes in passband profile or spectral bandwidth associated with using spectral modifying elements 100b or 100c in demultiplexer 20.

---

General Information one micrometer (μm) = $1 \times 10^{-6}$ meters
one micron (μm) = $1 \times 10^{-6}$ meters
one nanometer (nm) = $1 \times 10^{-9}$ meters
one micron = one micrometer = 1000 nanometers
Typical optical fiber dimensions Diameter of cladding and core = D = 125 μm ± 2 μm
Multimode fiber – diameter of core = d = 50 μm
Single mode fiber – diameter of core = d = 8.6–9.5 μm
Spectrum ranges for conventional optical fibers

| | |
|---|---|
| S Band (short wavelength) | 1280–1350 nm |
| C Band (conventional) | 1528–1561 nm |
| Blue band | 1528–1545 nm |
| Red band | 1545–1561 nm |
| L Band (long wavelength) | 1561–1620 ηm |
| Visible Light | | approximately 400 nm (0.4 Tm) to 700 ηm (0.7 Tm)
(dark violet blue to deep red)

---

Although the disclosed embodiments have been described in detail, it should be understood that various changes, substitutions and alterations can be made to the embodiments without departing from their spirit and scope.

What is claimed is:

1. An optical communication device comprising:
   a light focusing device;
   an input optical element optically coupled to the light focusing device, the input optical element operable to transmit a light signal so as to project the light signal through the light focusing device;
   a diffraction grating optically coupled to the light focusing device, the diffraction grating operable to diffract the light signal into spectral components and return the spectral components through the light focusing device, each spectral component having a respective passband profile;
   at least one output optical element operable to receive one of the spectral components from the light focusing device; and
   a spectral modifying element operable to transform the light signal primarily in a direction of dispersion associated with the diffraction grating to modify the passband profile of the spectral component prior to receipt of the spectral component by the at least one output optical element, and the spectral modifying element being disposed between the light focusing device and the diffraction grating.

2. The device of claim 1, wherein the light focusing device comprises a lens.

3. The device of claim 1, wherein the light focusing device and the spectral modifying element are integrated into one component.

4. The device of claim 1 wherein the spectral modifying element comprises a flat plate disposed at a selected angle relative to an optical axis of the device.

5. The device of claim 1, wherein the spectral modifying element comprises one of a cylindrical lens and a diffractive element.

6. The device of claim 1, wherein the spectral modifying element comprises one of a refractive lens having at least one aspherical cylindrical surface and a diffractive analogue of the refractive lens.

7. The device of claim 1, wherein the spectral modifying element comprises a cylindrical surface with a series of random phase plates.

8. The device of claim 1, further comprising a focal plane defined in part by a respective end of the input optical element and a respective end of the at least one output optical element, wherein the spectral modifying element is disposed between the focal plane and the light focusing device.

9. The device of claim 1, wherein the spectral modifying element comprises a cylindrical lens having a focal length much longer than a focal length of the light focusing device.

10. The device of claim 1, wherein the spectral modifying element has a first focal length in one direction and a second focal length in another direction, the first focal length being different from the second focal length.

11. The device of claim 1, further comprising:
   an input fiber optic cable coupled with the input optical element to communicate a multiple wavelength optical signal thereto, wherein the at least one output optical element is an array of output optical elements positioned to receive spectral components of the multiple wavelength optical signal; and
   a plurality of output fiber optic cables respectively coupled with the output optical elements.

12. An optical communication device, comprising:
a light focusing device;
a first number of input optical elements operable to transmit respective optical signals, the input optical elements positioned to project the respective optical signals through the light focusing device;
a diffraction grating positioned to receive the respective optical signals from the light focusing device, the diffraction grating operable to diffract the respective optical signals into a combined multiple wavelength optical signal having a passband profile and to return the combined optical signal through the light focusing device;
a second number of output optical elements operable to receive the combined optical signal from the light focusing device, the second number being smaller than the first number; and
a spectral modifying element operable to transform the respective signals primarily in a direction of dispersion associated with the diffraction grating to increase the passband profile of the combined optical signal received by the second number of output optical elements, the spectral modifying element being disposed between the light focusing device and the diffraction grating.

13. The device of claim 12, wherein the light focusing device comprises a lens integrated with the spectral modifying element.

14. The device of claim 12 wherein the spectral modifying element comprises a flat plate disposed at a selected angle relative to the optical axis of the device.

15. The device of claim 12, wherein the spectral modifying element comprises a cylindrical lens having unequal focal lengths in two directions.

16. The device of claim 12, wherein the spectral modifying element comprises one of an aspherical cylindrical lens and a diffractive element.

17. The device of claim 12, wherein the spectral modifying element comprises a cylindrical surface with at least one random phase plate.

18. The device of claim 12, further comprising:
a focal plane defined in part by a respective end of the first number of input optical elements and a respective end of the second number of output optical elements, wherein the spectral modifying element is disposed between the focal plane and the light focusing device.

19. The device of claim 12, wherein the spectral modifying element comprises a cylindrical lens having a focal length much longer than a focal length of a collimating optics.

20. The device of claim 12, wherein the first number of input optical elements is an array of input optical elements to transmit respective optical signals, the device further comprising:
a plurality of input fiber optic cables respectively coupled with the array of input optical elements to transmit the respective optical signals thereto; and
an output fiber optic cable coupled with the second number of output optical elements to receive the combined multiple wavelength optical signal therefrom.

21. An optical communication device comprising:
at least two light focusing devices;
an input optical element optically coupled to a first light focusing device, the input optical element operable to transmit a light signal so as to project the light signal through the first light focusing device;
a diffraction grating optically coupled to the first light focusing device, the diffraction grating operable to diffract the light signal into spectral components and return the spectral components through a second light focusing device;
an output optical element operable to receive one of the spectral components from the second light focusing device; and
a spectral modifying element operable to transform the light signal primarily in a direction of dispersion associated with the diffraction grating to increase the passband profile of the spectral component received by the output optical element.

* * * * *